United States Patent

[11] 3,617,150

| [72] | Inventor | Joseph A. Wagle |
| | | Indianapolis, Ind. |
| [21] | Appl. No. | 42,350 |
| [22] | Filed | June 1, 1970 |
| [45] | Patented | Nov. 2, 1971 |
| [73] | Assignee | General Motors Corporation |
| | | Detroit, Mich. |

[54] ROTOR DRUM
2 Claims, 2 Drawing Figs.

[52] U.S. Cl. .................................................. 416/198,
416/201, 416/244
[51] Int. Cl. ...................................................... F01d 5/06
[50] Field of Search ......................................... 416/198 A,
199–201, 218, 244

[56] References Cited
UNITED STATES PATENTS

| 2,440,933 | 5/1948 | Cunningham ................. | 416/201 X |
| 2,492,833 | 12/1949 | Baumann ...................... | 416/198 A X |
| 2,637,521 | 5/1953 | Constantine et al. ......... | 416/244 |
| 2,931,621 | 4/1960 | O'Donnell ..................... | 416/201 |

FOREIGN PATENTS

| 1,107,015 | 7/1955 | France ......................... | 416/198 |
| 1,140,306 | 11/1962 | Germany ...................... | 416/201 |
| 409,365 | 2/1945 | Italy .............................. | 416/201 |

*Primary Examiner*—Everette A. Powell, Jr.
*Attorneys*—Paul Fitzpatrick and Jean L. Carpenter ABSTRACT: A drum-type rotor for an axial flow compressor comprises a number of abutting annular sections (wheels and rings) bearing the rotor blades of the compressor. The sections are piloted together by overlapping interfitted flanges and are secured together by a polymer adhesive composition which is cured in place between the annular members and a containing ring spaced from them to define a cavity for the adhesive.

PATENTED NOV 2 1971  3,617,150

INVENTOR.
Joseph A. Wagle
BY
Paul Fitzpatrick
ATTORNEY

ROTOR DRUM

The invention herein described was made in the course of work under a contract or subcontract thereunder with the Department of Defense.

DESCRIPTION

My invention is directed to a system for joining together annular wheels or rings to form a composite structure of coaxial annular members. It is particularly suited to the requirements of axial flow compressors and is so described herein, although it may have other beneficial applications.

My invention involves the fixing together of succeeding coaxial sections of a rotor drum by an adhesive arrangement rather than be other well-known expedients such as tie bolts, welding, and so on.

Modification of an existing axial flow rotor to incorporate my invention provides substantial improvements by raising the first natural frequency of vibration of the rotor, reducing weight and cost, and providing some damping of rotor vibration. It also provides advantages in assembly of such a rotor. It eliminates the tie bolt as a permanent part of the structure.

The nature of my invention and its advantages will be clear to those skilled in the art from the succeeding detailed description of the preferred embodiment of the invention and the accompanying drawings thereof.

The invention is described herein in connection with its application to the rotor of a well-known aircraft gas turbine engine, the Allison Model 250 engine (military designation T63). Prior rotors for the compressor of this engine have comprised a forward wheel, a number of bladed rings between the wheels, and a final wheel which provides the centrifugal blading of the last stage of the compressor. One proposed rotor for this compressor is shown in U.S. Pat. No. 3,070,348 of Vogel issued Dec. 25, 1962. In the rotor employed in the engine and that shown in the patent, the successive rings or sections of the rotor are held together by a tie bolt extending along the axis of the rotor. Such rotors have required at least one intermediate wheel as a means to raise the critical frequency of the tie bolt.

According to my invention, the first stage wheel and the last stage centrifugal wheel are retained and the intermediate stages are defined by rings, preferably a first intermediate ring bearing the second and third stage blades and a second ring bearing the fourth, fifth, and sixth stage blades. The two intermediate bladed rings and the wheels at the end of the rotor are joined by a new type of connection devised by me, as will be explained further.

Figure 1:
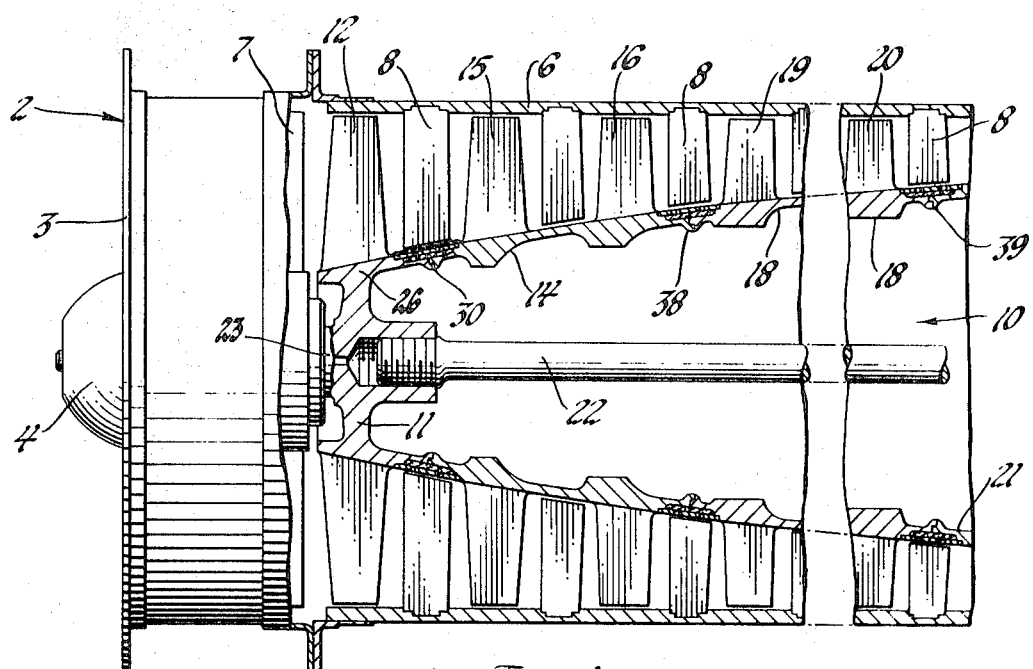
FIG. 1 is a view of an axial flow compressor, principally shown in section on a plane containing the axis of the compressor.

The axial flow compressor 2 of FIG. 1 comprises an air inlet housing 3 which defines an annular air inlet between the outer wall of the housing and a central bearing housing and support 4. The compressor includes a cylindrical case 6. The inlet housing includes inlet guide vanes 7 which serve as struts supporting the bearing housing 4. Annular rows or cascades of stator vanes 8 extend inwardly from the case.

The rotor 10 of the compressor includes a first stage wheel 11 bearing blades 12, a first bladed ring 14 bearing two rows of blades 15 and 16, and a second bladed ring 18 bearing fourth stage rotor blades 19, fifth stage blades (not illustrated), and sixth stage rotor blades 20. The annular members 11, 14, and 18 are in coaxial abutment and the ring 18 is in abutment with the last stage wheel (illustrated fragmentarily at 21) which is mounted in a suitable bearing (not illustrated) and includes means for connecting it to a drive shaft for the compressor. While the details of the last stage wheel are immaterial to my invention, it is pointed out that it is preferably essentially as shown in U.S. Pat. No. 3,070,348 except for the connection to the second bladed ring 18.

Figure 2:
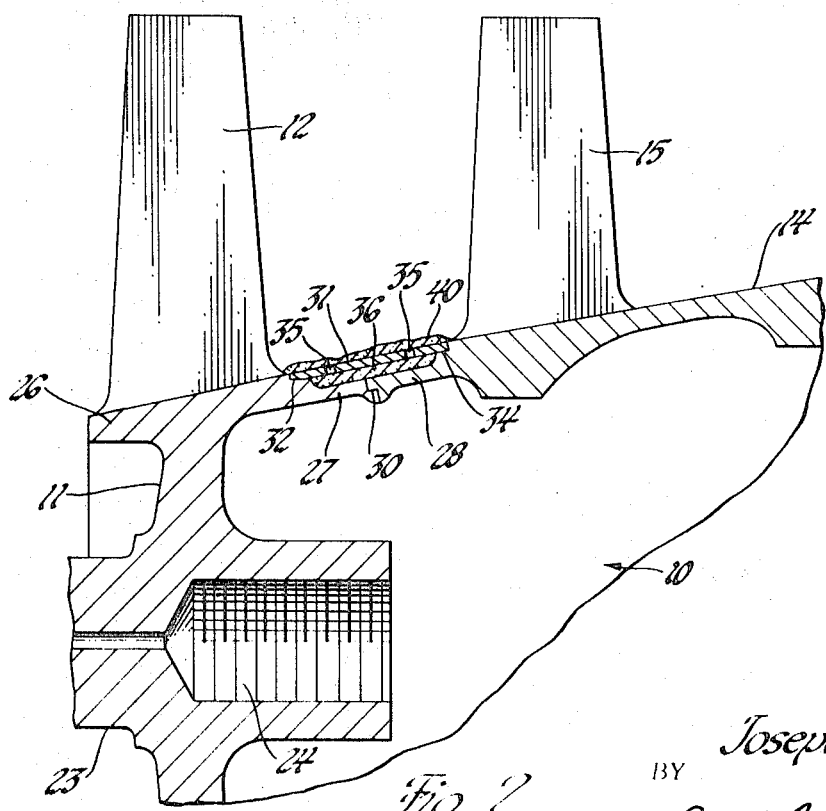
FIG. 2 is an enlarged view of a portion of the rotor of FIG. 1.

As shown in FIG. 1, a tie bolt 22 bearing against the last stage wheel and threaded into the hub of the first stage wheel holds the sections of the rotor together. This tie bolt is an essential part of the prior art rotor, but in my rotor it is simply a means for assembling the parts. Referring to FIG. 2, the first stage wheel 11 includes a shaft 23 which may be mounted in a suitable bearing in housing 4 and includes a threaded socket 24 for the tie bolt. It includes the annular row of blades 12 which may be welded to the rim 26 of the wheel.

In the particular compressor illustrated, the rotor diameter increases toward the high pressure end of the compressor. This is immaterial to the practice of the invention, however. The second stage blades 15 are shown as part of the first bladed ring 14. The rim 26 of wheel 11 includes a rearwardly extending portion 27 which abuts a forwardly extending rim portion 28 of the first bladed ring. The rear edge of flange portion 27 is piloted at 30 into the forward edge of rim portion 28, this pilot including a circumferential fit between cylindrical surfaces of the two parts and an abutment between radial surfaces so that the two rotor portions 11 and 14 are aligned by this interfit or pilot.

A containing ring of light sheet metal strip, which is an endless ring preferably having a welded joint where the ends of the strip meet, is disposed around and spaced radially from the interfit 30. The containing ring 31 is radially piloted on the parts 11 and 14 at 32 and 34, respectively. This may be a secondary pilot between adjacent bladed members. A number of holes 35 through the containing ring 31 are spaced around the circumference of the rotor. The annular cavity between ring 31 and the rim margins 27 and 28 is filled with a suitable adhesive 36 such as a polymer adhesive, for example an epoxy adhesive. The joints indicated at 38 and 39 between succeeding annular members of the rotor are preferably identical to that shown in detail in FIG. 2 except for dimensions.

In assembling the rotor, the parts 11, 14, 18, and 21 are fitted together with the containing rings 31 piloted on them and the tie bolt 22 is tightened to hold the members in proper alignment and firm abutment. The assembly is then balanced, and thereafter the polymer adhesive is injected through some of the holes 35 so as to completely fill the cavity under the ring with the adhesive. Other holes 35 permit inspection to assure complete filling of the cavity. The assembly is then heated to cure the adhesive, after which the tie bolt is removed and the assembly is checked for balance and the balance corrected if necessary.

FIG. 2 shows also a layer 40 disposed on the outer surface of the contacting ring 31, this material being an abradable coating to minimize the clearance between the inner ends of the stator vanes 8 and the rotor so as to minimize tip leakage between the rotor surface and the stator vanes. The material 40 should be one which will be self-retentive on the rotor but sufficiently soft to be cut away in the event of interference between the surface of the material and the stator vanes without damage to the vanes. It may be a metallic spray, for example.

If it should be necessary to disassemble the rotor, this may be done either by heating the joints between the sections to burn out the adhesive or by machining the joint away.

The drum rotor as illustrated is of greater stiffness and lighter weight than prior rotors of the same dimensions and has a higher frequency of natural vibration, thus raising the critical speed of the rotor which is desirable and permits elimination of means for damping tie bolt vibration such as a bump connection between intermediate rotor wheels and the tie bolt. The self-contained drum structure is more rigid than a tie-bolted structure and has a higher critical frequency. Weight is reduced by elimination of the tie bolt. While the sections of the rotor are assembled positively together, the plastic material 36 does have some tendency to damp any vibrations set up in the rotor by the blades or otherwise. It will be apparent that the mode of connection illustrated is a simple and inexpensive one and quite effective.

The detailed description of the preferred embodiment of the invention for the purpose of explaining the principles thereof is not to be considered as limiting or restricting the invention, as many modifications may be made by the exercise of skill in the art.

I claim:

1. A turbomachine rotor of the axial flow type comprising a plural number of annular members fixed together in coaxial alignment defining a blade-supporting drum adapted for rotation about the axis of the members characterized by connections between adjacent members comprising, in combination, a rearwardly directed rim on a first said member, a forwardly directed rim on a second said member next rearward to the first member, a pilot joint between the two rims effective to align the members coaxially, a containing ring piloted on the said rims spaced radially from the pilot joint and defining with the said rims an annular cavity, and an adhesive filling the said cavity and holding the rims against separation.

2. A turbomachine rotor comprising, in combination, a first annular bladed member having an axially extending rim portion, a second annular bladed member having an axially extending rim portion abutting the first rim portion, a mechanical interfit between the said portions providing relative radial and axial location of the two members, a containing ring radially spaced from the said interfit and axially aligned with the said interfit radially supported by the said bladed members and defining with the said members an annular cavity, the rotor defining access holes for injection of a plastic adhesive into the said cavity, and a cured plastic adhesive filling the said chamber and holding the said members cemented together in abutting relationship.

* * * * *